UNITED STATES PATENT OFFICE.

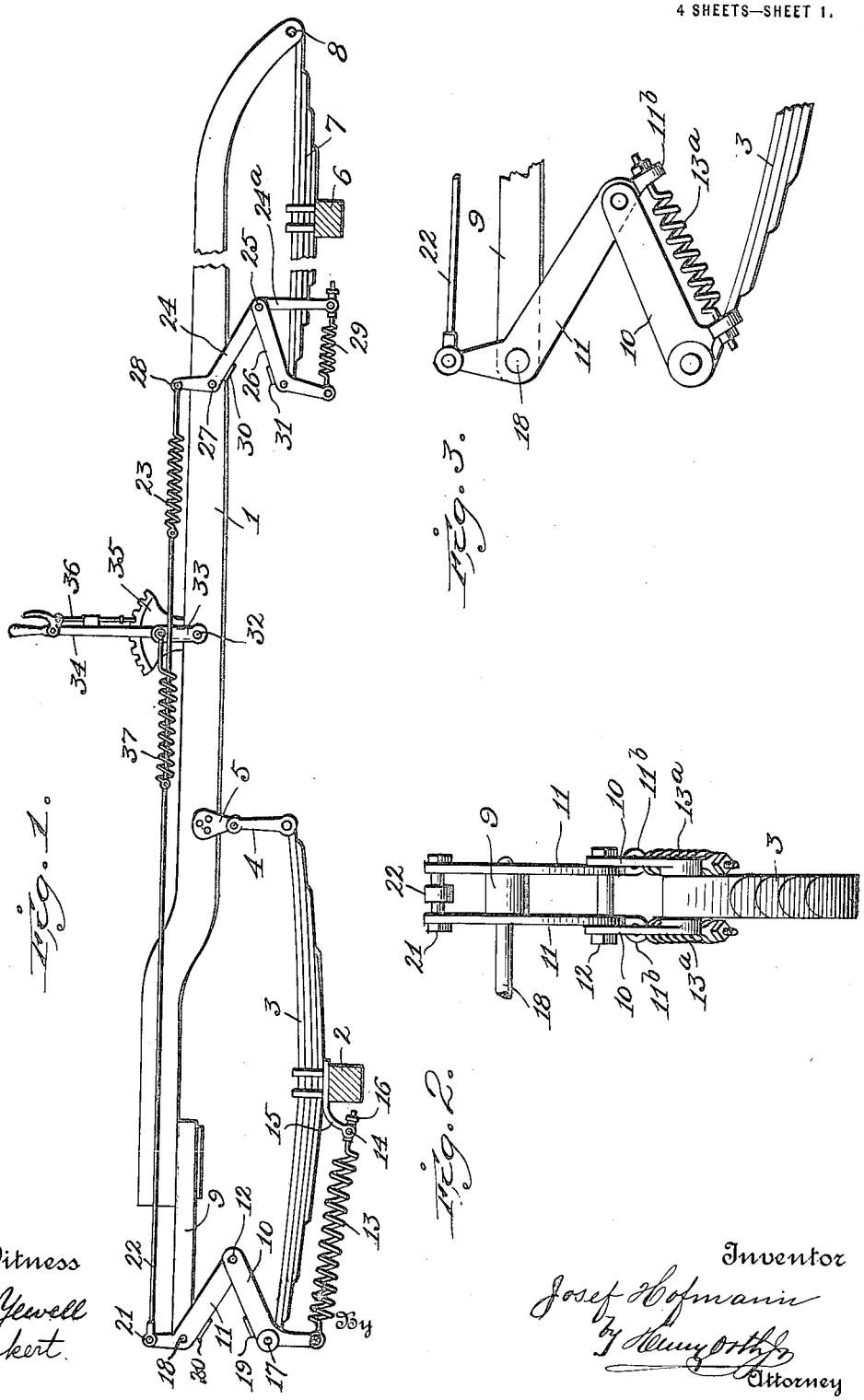

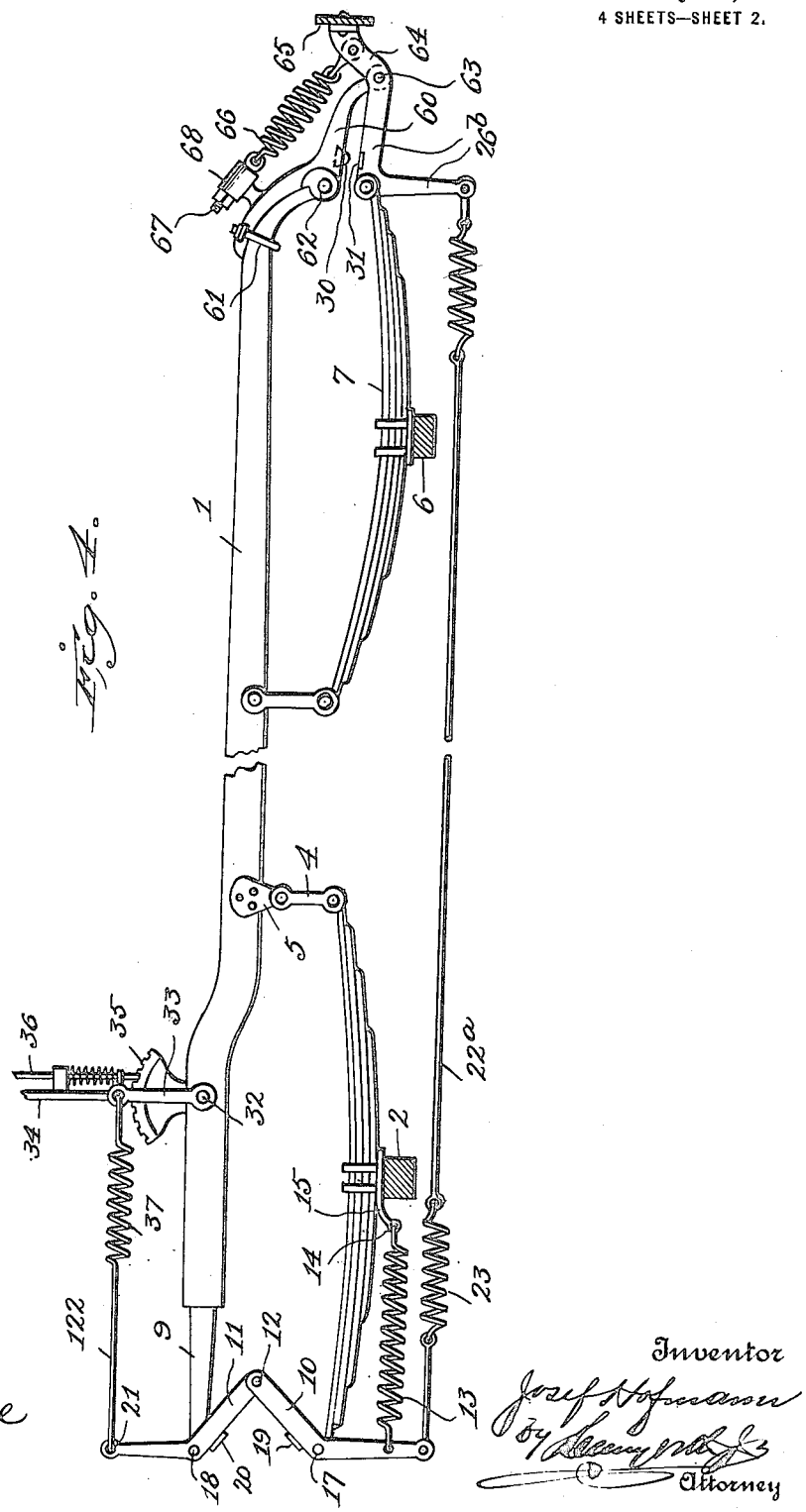

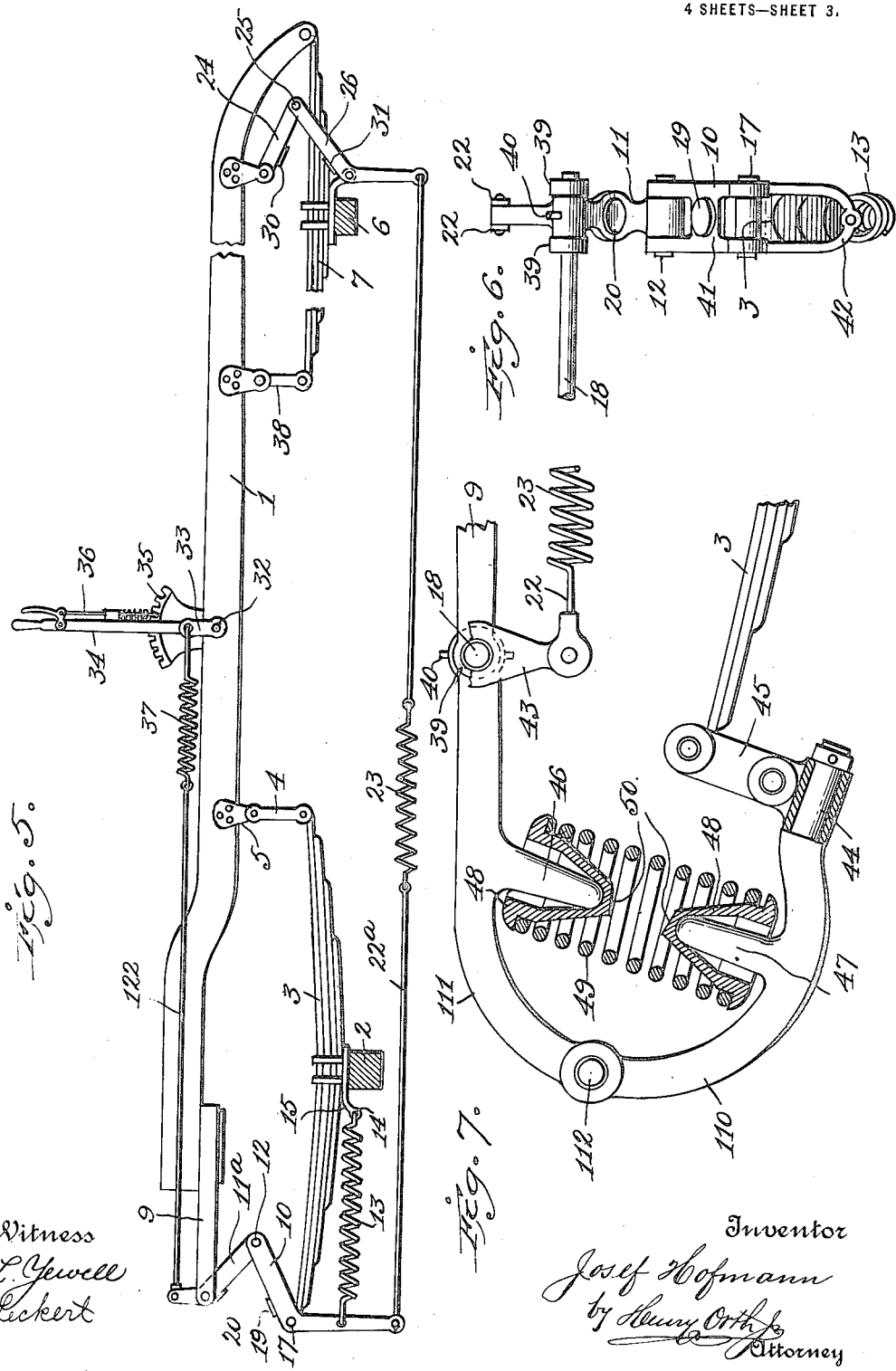

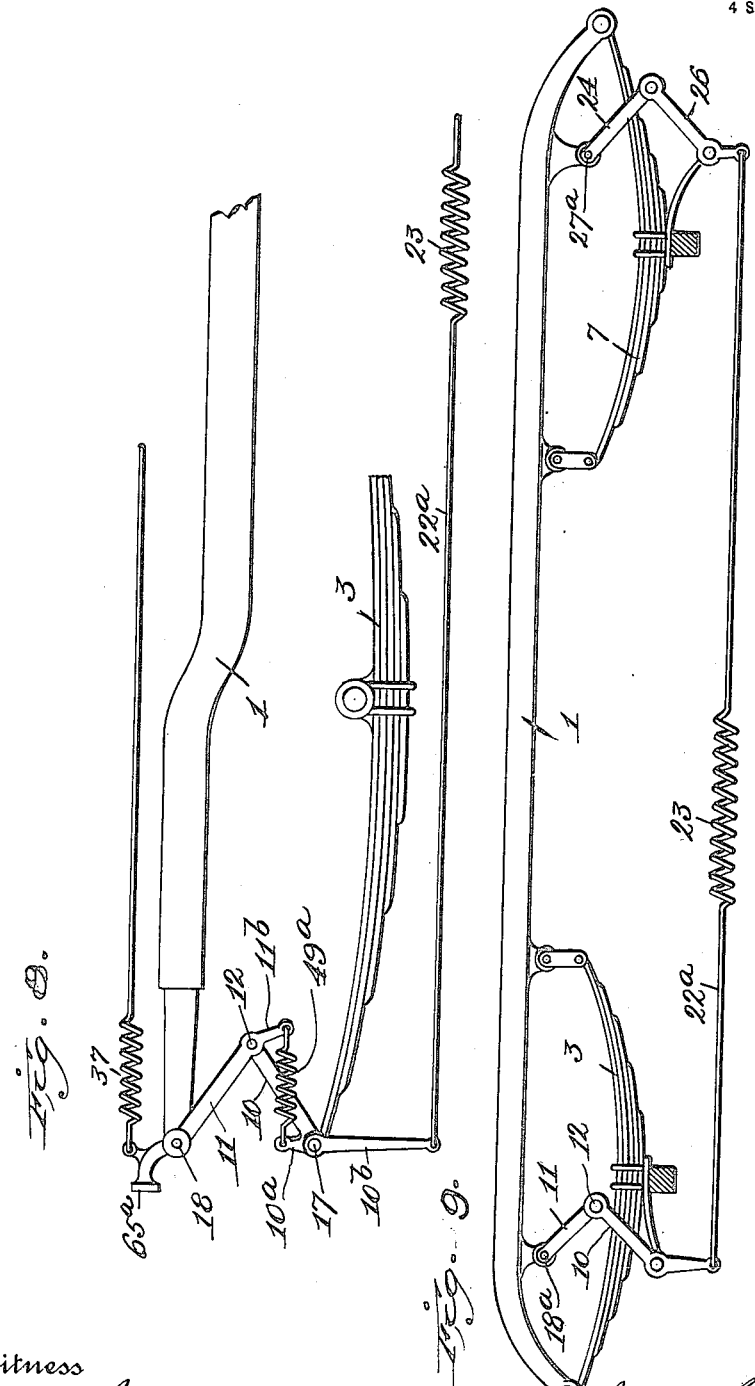

JOSEF HOFMANN, OF BAUMAROCHE, SWITZERLAND.

CUSHIONING MECHANISM FOR VEHICLE-BODIES.

1,304,982. Specification of Letters Patent. Patented May 27, 1919.

Application filed July 25, 1916. Serial No. 111,177.

*To all whom it may concern:*

Be it known that I, JOSEF HOFMANN, a citizen of Switzerland, residing at Baumaroche, Switzerland, have invented certain new and useful Improvements in Cushioning Mechanism for Vehicle-Bodies; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention relates to cushioning mechanism for vehicle bodies, and more particularly for the bodies of motor vehicles, and it has for its object, beside effecting the usual cushioning due to the customary springs of the front and rear suspensions of the running gear, to also counteract either the pitching or rolling of the body of the vehicle with respect to the wheel axles, or to counteract both of these objectionable motions. The pitching of the vehicle is caused by passing over rises and through hollows in the road, while the rolling is produced by centrifugal action when one side of the vehicle moves up or down with respect to the other side.
I also provide means for stiffening the suspension when the vehicle carries an additional load, this preferably being done by the movement of a lever at the operator's position, or any other mechanical arrangement.

To this end, in addition to the usual body springs, which with the axles on which they are mounted form the front and rear suspensions for the frame, I use auxiliary spring-controlled devices or shock absorbers, the front and rear devices being connected together and cross connected from one side to the other, so that the movement of the body at one end influences the movement of the body at the other end, and the movement of the body at one side influences the movement of the body at the other side, and vice versa.

In order that my invention may be fully understood, I will now describe the same with reference to the accompanying drawings, wherein like parts are similarly designated, and in which—

Figure 1 is a side view of one form of the suspension.

Figs. 2 and 3 are detail end and side views respectively, of a modified structure of the shock absorbers.

Fig. 4 is a side view of a modified form of suspension.

Fig. 5 shows another modification.

Fig. 6 is a rear view of a shock absorber showing a portion of the cross connecting shaft.

Fig. 7 shows another form of shock absorber.

Fig. 8 is a modification of Fig. 7, in which the spring between the bell-crank levers is under tension instead of compression.

Fig. 9 shows a pair of shock absorbers included between the front and rear suspensions, but which do not carry the load.

In Fig. 1 I have shown so much of a chassis as will be necessary for a full understanding of my invention, and in which, 1 is the frame, connected, as usual, to a rear suspension comprising the rear axle 2, the rear leaf spring 3, and the shackle 4 connecting the forward end of the rear leaf spring to a bracket 5 on the frame 1.

The forward suspension comprises the front axle 6, the front leaf springs 7 mounted thereon and connected to the downwardly turned ends of the frames, as is customary in most motor vehicles.

My invention embraces the inclusion between the suspensions, whether it be between the leaf springs or the axles of these suspensions, and the frame, of shock absorbers of a type capable of being connected together front and rear, to prevent the pitching of the car body.

My invention further embraces the cross connection of these shock absorbers, to prevent the rolling of the body, and

My invention also embraces means for adjustably tensioning the rear suspension from the driver's seat or otherwise, for material variation of load.

To these ends, as shown in Fig. 1, I place between the rear end of the rear spring 3 of the rear suspension, and the frame, or an extension of the frame, a shock absorber consisting essentially of two bell-crank levers, 10 and 11, pivotally connected together at 12. The shorter arm of the lower bell-crank lever 10 is connected to one end of a coil spring 13 whose opposite end is pivoted at 14 in a bracket 15 on the rear axle 2. The spring is adjustable in the pivot 14 by means of nuts 16, to vary its tension, and if found desirable, the end connected to the bell-crank lever 10 may be arranged to be adjusted in a like manner. The bell-crank lever 10, is pivoted at 17 in the end of the leaf spring 3, while the upper bell-crank lever 11 is pivoted at 18 in the frame extension 9. The levers 10 and 11 carry coöperating buffers 19 and 20 respectively, of rubber or other suitable material.

As shown in Fig. 1, the arms of the bell-crank levers that are pivoted together are of equal length, but this is not necessarily so, and one of these arms may be shorter than the other, as shown at 11$^a$, Fig. 5. The shorter arm of bell crank lever 11 is pivotally connected at 21 to one end of a rod 22, having interposed at any convenient point in its length a coil spring 23. The other end of this rod is connected to the shock absorber included between the front suspension and frame.

This front shock absorber is similar in structure to the one at the rear, and comprises an upper bell-crank lever 24, pivotally connected at 25 to a lower bell-crank lever 26. The bell-crank lever 24 is pivoted to the frame at 27, or otherwise pivoted as hereinafter described. The shorter arm of this lever is connected to rod 22 at 28. This bell-crank lever 24 has an extension 24$^a$ in the end of which is adjustably fastened one end of a coil spring 29 whose other end is fastened adjustably or otherwise to the shorter depending arm of bell-crank lever 26.

The levers 24 and 26 carry buffers 30 and 31 respectively, similar to those numbered 19 and 20 at the rear.

The mechanism thus far described is of course duplicated on the opposite side of the frame.

Mounted in the frame 1 at any suitable point along its length is a transverse shaft 32, having at or near its ends crank arms 33, one near each side of the vehicle, and an operating lever 34, sector 35 and latch 36. The crank arms 33 are connected to the rods 22 through the medium of coil springs 37, substantially as shown.

The pivot 18 at the rear is preferably a shaft or a flexible steel blade to which the bell crank lever 11 is rigidly fastened, and this shaft extends across the frame and has secured at its opposite end the bell-crank lever 11 on the other side of the vehicle.

The pivot 27 at the front end ordinarily cannot be a shaft extending across the frame, so that the levers 24 on the two sides of the front must be separately pivoted to the frame 1; but in those vehicles whose structure permits it, the levers 24 at the front are also rigidly connected to a shaft extending across the frame.

The car, by reason of irregularities in the road, will pitch or roll or both pitch and roll, due to inertia and shifting of the center of gravity of the body with respect to the running gear. Now, if at this moment we can decrease or increase the resistance to motion of the body, the movement of the body will be considerably reduced and the body be stabilized.

The downward movement of the body closes bell-crank levers 10 and 11, and the upward movement opens them. These movements are controlled by the springs 13 and 37. Similarly, the front shock absorber levers 24 and 26 are controlled by springs 29 and 23.

By cross connecting the shock absorbers by shafts, as 18 and 27, the operations of the shock absorbers during rocking are counteracted, the shock absorber on one side tending to close, while that on the other tends to open, thus preventing the lateral shifting of the center of gravity of the body.

Since the springs 13 and 37, and 23 and 29, combined with the bell-crank levers, form a structure, introduced between the main springs and the frames, of greater flexibility than the main spring itself, the cross connection eliminates the action of this combination to a greater or less extent and transfers the body movements to the stiffer main springs 3 and 7 when rolling takes place. These main springs then counteract effectively the rolling movement.

I may also connect the shock absorbers, front and rear, for example, by rod 22, to reduce the pitching. This front and rear connection does not eliminate the action of the shock absorbers during the pitching movements and transfer the body movements to the main springs, as with the cross connections; it does, however, reduce the pitching, by causing both ends of the body to tend to move simultaneously in the same direction, i. e., when the front of the frame 1 pitches down, the front shock absorber levers 24, 26, tend to close, point 28 will move to the left and allow point 21 to similarly move, and reduce the lifting power of the rear shock absorbers.

When the frame moves upward, away from the suspensions, the levers 10, 11, and 24, 26, tend to open, and the action is the opposite of that just described.

By adjusting lever 34 the tension of springs 37 may be increased or diminished, to stiffen or soften the suspension, according to the load.

In order to dispense with the bracket 15 I so construct levers 10 and 11 that they may be readily applied to existing springs by providing an extension 11$^b$ on the levers 11, Figs. 2 and 3, and including the springs 13$^a$ between these extensions and the shorter arm of lever 10, so that these springs will lie substantially parallel to the long arms of levers 10.

In these figures it will be noted that each lever 10 and 11 consists of duplicate parts, so that the rear frame extension 9 may be placed between the parts of lever 11 and the end of leaf spring 3 be connected between the parts of lever 10. Obviously, two springs 13ᵃ will be required.

In Fig. 4 I have shown the rod or wire rope 22ᵃ connecting the front and rear shock absorbers placed below the vehicle and connecting the lower levers 10 and 26ᵇ together, instead of connecting the upper levers, as in Fig. 1. Springs 37 are then connected to the upper rear levers 11 by separate rods 122.

In this figure (4) I have shown at the front but a single bell-crank lever 26ᵇ that is movable, the other lever in this case forming the connecting and supporting means 60 fastened by a yoke 61 and a bolt 62 to the usual downwardly turned front end of the frame 1. The lever 26ᵇ is pivoted in the end of the member 60 at 63, and has an arm 64 projecting beyond this point. The projecting arms 64 of the levers on opposite sides of the frame are cross connected by a bar 65, which by reason of its position acts not only to cause the bell-crank levers 26ᵇ to operate in unison, but also acts as a buffer bar. The lever arm 64 is connected by a spring 66 to a pin or bolt 67 adjustably mounted in an eye 68 on the part 60, as shown.

By making the buffer bar 65 flexible, so as to permit torque between its ends the action from the shock absorber on one side is yieldingly transmitted to the shock absorber on the other side of the vehicle.

30 and 31 are rubber or other buffers. When the car strikes an obstacle the yielding buffer rod 65 is forced upward about pivots 63, thus causing the lever 26ᵇ to transmit the shock as a downward movement to the main spring 7 of the front suspension at the same time lifting the front of the frame 1, and partly to the rear suspension by rod or wire rope 22ᵃ to lift the rear of the frame 1 also.

In Fig. 5 I have shown a slight modification over what is shown in Figs. 1 and 4. The levers 10 and 11ᵃ are of unequal length, and the front shock absorber, instead of being included between the end of the front spring 7 and the frame 1, is included between the front axle 6 and the frame 1. The rear end of the leaf spring 7 in this instance is connected to the frame 1 by a shackle 38, as is customary.

In Fig. 6 I have shown an end view of one of the shock absorbers, the rear frame extension being forked, as shown at 39. The shaft 18 passes through the forks and the levers 11. The lever is held fast to the shaft by a cotter pin 40, or otherwise. The lever 10 is forked, and the pivot pin 12 passes through the fork of lever 10 and the lower end of lever 11. The buffer 19 is supported on the connecting web 41 between the forks of lever 10. The end of the leaf spring 3 lies between the forks and is secured therein by pin 17. The forks are united at the lower end at 42, where the rod 22ᵃ or spring 13 is secured to them.

In Fig. 7 I have shown another form of rear shock absorber, in which the hinge point 112 is projected to the rear, instead of between the leaf spring and frame, as in the other figures. Shaft 18 is mounted in the forked end 39 of the rear frame extension 9 and the lever arm 111 is secured to said shaft 18 between the forks 39 by pin 40. The short lever arm 43 of lever 111 is here made as a separate element and secured to shaft 18, and is arranged to depend below the extension 9 instead of projecting above said extension, as in the other figures, and is connected to rod 22, if the vehicle is provided with front shock absorbers. If the vehicle is not so provided, then the rod 22 is connected to hand lever 34, only. The end of lever 110 is swiveled in a bearing 44 that is connected by a shackle 45 to the rear leaf spring 3. The two curved levers 110 and 111 are hinged together at 112, and each lever carries pin 46, 47. These pins project toward one another and are so arranged that under normal load they are in alinement. On each pin is a cup-shaped spring bearing 48 for supporting a spring 49 between them. These bearings and pins are, in effect, universal joints or bearings, allowing the axis of the spring 49 to be maintained in a straight line under all conditions of operation.

The inner ends of the cups 48 are flattened at 50 to act as buffer surfaces, or for the support of buffer rubbers.

In Fig. 7 the cross connection of the shock absorbers by the rod 18 eliminates the movement of the levers 111 leaving levers 110 still active.

When not cross connected the spring 49 will be compressed and de-compressed to a less extent than when the cross connection is present, provided the levers 111 do not tend to operate in unison.

If levers 111 do not yield when cross connected the resilience of the shock absorbers is considerably increased, and also counteracts to a great degree the pitching movement.

Fig. 8 is a modification of Fig. 7. In this instance also both ends of the spring 49ᵃ which carries the load, move in the same direction at different ratios, but with this difference, they move from one another instead of toward one another. In this structure lever 10 has an upward extension 10ᵃ to which one end of spring 49ᵃ is connected, the other end of the spring being connected to an extension 11ᵇ on lever 11. The lever 11 also has a buffer 65ª forming the cross connection between it and a like lever on the opposite side of the car. The downward extension 10ᵇ forming part of lever 10, or the equivalent, is connected beneath the car to the front shock absorber by rod 22ª and spring 23, as before.

In Fig. 9 the shock absorbers do not carry the load, that being done by the body springs 3 and 7. The front and rear shock absorbers are connected front and rear by rod 22ª and spring 23, to ease pitching, and may or may not be cross connected at 18ª and 27ª.

I claim—

1. In a vehicle, the combination with the vehicle frame and front and rear suspensions for said frame; of shock absorbers comprising a pair of levers pivoted together between the frame and the front and rear suspensions, one of said levers being connected to the frame and the other to its suspension, and one of the levers connected to an auxiliary tension spring, and a connecting member between a lever of the front shock absorber and a lever of the rear shock absorber, said levers arranged for simultaneous movement in the same direction causing simultaneous movement of both ends of the frame in the same direction.

2. In a vehicle, the combination with the vehicle frame and front and rear suspension for said frame; of shock absorbers arranged for action in the same direction comprising pivoted levers included between the frame and front and rear suspensions, and a connecting member between a lever of the front shock absorber and a lever of the rear shock absorber and a spring included in said connection to permit a degree of independent movement of the shock absorbers.

3. In a vehicle, the combination with the vehicle frame and front and rear suspension for said frame; of shock absorbers comprising pivoted levers included between the frame and front and rear suspensions, a connecting member between a lever of the front shock absorber and a lever of the rear shock absorber, and means to rigidly connect together at one end of the vehicle a lever of each shock absorber at opposite sides of said vehicle to cause said connected levers to rock in unison.

4. In a vehicle, the combination with the frame and the rear suspension, of a shock absorber at each side of the vehicle comprising levers pivoted together and arranged to connect elements of the rear suspension with said frame and a spring to prevent the collapse of said levers, and means to rigidly connect a lever of the shock absorber on one side of the vehicle to a lever of the shock absorber on the other side of said vehicle to cause said levers to rock in unison.

5. In a vehicle, the combination with the vehicle frame and a front and a rear suspension for said frame; of shock absorbers each comprising pivoted levers included between the front and the rear suspensions and the frame, a connecting member between a lever of the front shock absorber and a similar lever of the rear shock absorber, both of said levers connected by said member being arranged for simultaneous movement in the same direction, and adjustable, yielding means simultaneously acting on both of said shock absorbers to increase or decrease the stiffness of the suspensions.

6. In a vehicle, the combination with the frame and the rear suspension, of a shock absorber at each side of the vehicle, comprising levers pivoted together and arranged for action in the same direction and to connect elements of the rear suspension with said frame, means to rigidly connect a lever of the shock absorber on one side of the vehicle to a lever of the shock absorber on the other side of the vehicle to cause said levers to act in unison, and means acting on the shock absorbers to increase or decrease the stiffness of the suspensions.

7. In a vehicle, the combination with the vehicle frame and front and rear suspensions for said frame; of shock absorbers, each comprising a pair of levers pivoted together and having one of the levers pivotally connected to a suspension and the other to the frame, means to connect one lever of the rear shock absorber on one side of the vehicle with a lever of the front shock absorber on the same side of the vehicle, a spring interposed in said connecting means, means connected to a lever of the rear shock absorber and including a spring, to vary the angular relation between levers of the rear shock absorbers.

8. In a vehicle, the combination with a vehicle frame and front and rear suspensions for said frame; of shock absorbers each comprising two levers pivotally connected together, one of said levers being pivotally connected to the frame and the other to a suspension, and means to yieldingly connect one lever of the rear shock absorber on one side of the vehicle with the similar lever of the front shock absorber on the same side of the vehicle.

9. In a vehicle, the combination with a vehicle frame and front and rear suspensions for said frame; of shock absorbers each comprising two levers pivotally connected together, one of said levers being pivotally connected to the frame and the other to a suspension, means to yieldingly connect one lever of the rear shock absorber on one side of the vehicle with the similar lever of the front shock absorber on the same side of the vehicle, and means connected to the upper lever of the rear shock absorber to produce an adjustable tension thereon.

10. In a vehicle, the combination with a vehicle frame and front and rear suspensions for said frame; of shock absorbers each comprising two levers pivotally connected together, one of said levers being pivotally connected to the frame and the other to a suspension, means to yieldingly connect one lever of the rear shock absorber on one side of the vehicle with the similar lever of the front shock absorber on the same side of the vehicle, means connected to the upper lever of the rear shock absorber to produce an adjustable tension thereon, and a shaft cross connecting the upper levers of the rear shock absorbers.

11. In a vehicle, the combination with a vehicle frame and front and rear suspensions for said frame; of shock absorbers each comprising two levers pivotally connected together, one of said levers being pivotally connected to the frame and the other to a suspension, means to yieldingly connect one lever of the rear shock absorber on one side of the vehicle with the similar lever of the front shock absorber on the same side of the vehicle, means connected to the upper lever of the rear shock absorber to produce an adjustable tension thereon, a shaft cross connecting the upper levers of the rear shock absorbers and a like shaft cross connecting the upper levers of the front shock absorbers.

12. In a vehicle, the combination with the vehicle frame and front and rear suspensions for said frame; of shock absorbers comprising levers pivoted together included between the frame and the front and rear and springs to prevent the collapse of said levers, an arm projecting from a shock absorber lever at one end of the vehicle and a bar cross-connecting a like arm on a like lever at the same end of the vehicle but at the opposite side thereof.

13. In a vehicle, the combination with the vehicle frame and front and rear suspensions for said frame; of shock absorbers comprising pivoted levers included between the frame and the front and rear suspensions, each shock absorber including a spring acting upon a lever to urge the frame and suspension apart, and a bar cross-connecting the shock absorbers at one end of the vehicle and projecting beyond the end of the vehicle frame.

14. In a vehicle, the combination with the vehicle frame and front and rear suspensions; of a shock absorber between the frame and each suspension comprising levers, a spring to prevent the collapse of said levers, a connecting member between levers of the front and rear shock absorbers on each side of the vehicle, and a buffer bar cross-connecting the shock absorbers at one end of the vehicle and projecting beyond the end of the frame.

15. The combination with a vehicle body frame and the front and rear main springs; of shock absorbers between said frame and springs capable of movement substantially independently of said springs, and each including a pivoted lever and means to render said levers automatically inoperative during the rolling of the body frame and to automatically transfer their duty to the main springs.

16. The combination with a vehicle body frame and the front and the rear main springs; of front and rear shock absorbers each shock absorber comprising two normally diverging inclined levers pivoted together, and means to automatically render one of the levers of each shock absorber inactive during the rolling of the body frame and to simultaneously and automatically increase the duty of the main springs.

17. The combination with a vehicle body frame and front and rear main springs; of shock absorbers for the front and rear of said frame arranged for action in the same direction, means interconnecting the rear shock absorbers to reduce rolling of the body frame, and means interconnecting the shock absorbers on each side of the vehicle to reduce pitching, said means being capable of independent and simultaneous action.

18. The combination with a vehicle body frame and the front and rear main springs; of shock absorbers for the front and the rear of said frame, each shock absorber comprising a pair of levers pivoted together with means to automatically render one of said levers of each shock absorber substantially inactive during rolling of the body, and means connecting together the levers of the front and rear shock absorbers that are capable of being rendered inactive to counteract the pitching of the frame, said means being capable of simultaneous and independent action.

19. The combination with a vehicle body frame and the front and rear main springs; of front and rear shock absorbers for the frame, and a cross-connection between shock absorbers on opposite vehicle sides to automatically render the shock absorbers substantially inactive during the rolling of the body frame, and transfer substantially the whole of the body load to the main spring, and a connection between front and rear shock absorbers to automatically reduce the action, or to render inactive the shock absorbers at one end of the vehicle when the other end is displaced from its normal by the pitching of said frame.

20. In a vehicle, the combination with a vehicle frame and front and rear suspensions for said frame; of shock absorbers each comprising two levers pivotally connected together, one of said levers being connected to the frame and the other to a suspension, means to yieldingly connect one of the levers of one shock absorber on one side of the vehicle with a similar lever of the other shock absorber on the same side of the vehicle, and means connected to the other lever of the first mentioned shock absorber to produce an adjustable tension thereon.

In testimony that I claim the foregoing as my invention, I have signed my name in presence of the subscribing witness.

JOSEF HOFMANN.

Witness:
J. H. KNOWLES.